United States Patent [19]
Stultz et al.

[11] Patent Number: 5,540,847
[45] Date of Patent: Jul. 30, 1996

[54] SLUDGE DIGESTION

[76] Inventors: Jeffrey H. Stultz, 115 Tuna Trail, Freeport, Tex. 77541; Danford L. Bice, 218 Flag Dr. West, Lake Jackson, Tex. 77566

[21] Appl. No.: 280,871

[22] Filed: Jul. 26, 1994

Related U.S. Application Data

[63] Continuation-in-part of Ser. No. 55,159, Apr. 29, 1993, abandoned.

[51] Int. Cl.$^6$ .................................................. C02F 11/08
[52] U.S. Cl. ........................... 210/750; 210/761; 210/766
[58] Field of Search ................................. 210/612, 613, 210/631, 749, 750, 758, 761, 764, 766

[56] References Cited

U.S. PATENT DOCUMENTS

| | | |
|---|---|---|
| 800,187 | 9/1905 | Venable . |
| 2,315,577 | 4/1943 | Bach ............................................ 210/2 |
| 2,809,933 | 10/1957 | Halvorson .................................. 210/16 |
| 2,992,986 | 7/1961 | Ingram ........................................ 210/17 |
| 3,060,118 | 10/1962 | Schoffel et al. ............................... 210/3 |
| 3,192,155 | 6/1965 | Bready et al. ........................... 210/705 |
| 3,272,240 | 9/1966 | Gitchel et al. ............................. 210/63 |
| 3,359,200 | 12/1967 | Gitchel et al. ............................. 210/63 |
| 3,371,033 | 2/1968 | Simmons et al. ............................. 210/3 |
| 3,468,795 | 9/1969 | Bye-Jorgensen ............................. 210/7 |
| 3,730,881 | 5/1973 | Armstrong .................................. 210/6 |
| 4,017,421 | 4/1977 | Othmer ..................................... 252/416 |
| 4,119,495 | 10/1978 | Belyaev ................................... 195/102 |
| 4,129,502 | 12/1978 | Garrett et al. ............................. 210/60 |
| 4,203,838 | 5/1980 | Shimizu et al. ........................... 210/761 |

(List continued on next page.)

FOREIGN PATENT DOCUMENTS

| | | |
|---|---|---|
| 35 01 778.3 | 1/1985 | Germany . |
| 1310794 | 6/1988 | Japan . |
| 501977 | 7/1973 | U.S.S.R. . |

OTHER PUBLICATIONS

"Texas Operations Wastewater Treatment Plant Dow USA" Mar. 1992 The Wet Air Oxidation (WAO) of Wastes: Othmer, Mechanical Engineering, Dec. 1979, pp. 30–37.
"The Effect of pH on the Heat Treatment of Sewage Sludges", Everett, Water Research, vol. 8, pp. 899–906, 1974.
"Wet Air Oxidation" Teletzke, Chemical Engineering Progress pp. 33–38, Jan. 1964.
"New Waste Disposal Process" Zimmerman, Chemical Engineering, pp. 117–120, Aug. 1958.
"Wet Air Oxidation of Sewage Sludge" Hurwitz et al., Water and Sewage Works, pp. 298–305, Aug. 1965.
"Effect of Thermal Pretreatment on Digestibility and Dewateraability of Organic Sludges" Haug, Journal WPCF, Jan. 1978, pp. 73–85.
"Control of Biological Solids Concentration in Extended Aeration" Yang et al. Journal WPCF, pp. 543–553, Mar. 1974.
"Studies on the Total Oxidation of Acitvated Sludge With and Without Hydrolytic Pretreatment" Gaudy et al., Journal WPCF, pp. 40–54, Jan. 1971.
"Pilot Plant Studies on Hydrolytically–Assisted Extended Aeration Processes At High Organic Loadings", pp. 903–913, May. 1976, Gaudy et al.
"Removal of Cadmium at High and Low Dosages By an Extended Aeration Process" Lowe pp. 431–442, 1983.

*Primary Examiner*—Christopher Upton

[57] ABSTRACT

Processes are disclosed for treating materials such as waste material, wastewater, and sludge, particularly waste activated sludge (WAS). In one aspect a process according to the present invention includes denaturing, acidifying and degassing incoming WAS while venting gases produced, preferably to a vent treatment system; feeding the resulting denatured WAS to a reactor into which are fed steam and oxygen, the steam discontinued once the reaction becomes autothermal; venting hot gases from the reactor back to the degassing step, to heat recovery or to a reactor, e.g. a sequencing batch reactor; and cooling and neutralizing the reactor product. Batch, semi-continuous, and batch sequencing methods are disclosed.

28 Claims, 6 Drawing Sheets

U.S. PATENT DOCUMENTS

| | | | |
|---|---|---|---|
| 4,213,857 | 7/1980 | Ishida et al. | 210/6 |
| 4,246,099 | 1/1981 | Gould et al. | 210/609 |
| 4,277,342 | 7/1981 | Hayes et al. | 210/609 |
| 4,289,625 | 9/1981 | Tarman et al. | 210/603 |
| 4,297,216 | 10/1981 | Ishida et al. | 210/613 |
| 4,328,104 | 5/1982 | Hanke et al. | 210/603 |
| 4,367,146 | 1/1983 | Pollock et al. | 210/603 |
| 4,370,233 | 1/1983 | Hayes et al. | 210/609 |
| 4,510,243 | 4/1985 | Haga et al. | 210/712 |
| 4,551,250 | 11/1985 | Morper et al. | 210/603 |
| 4,559,142 | 12/1985 | Morper | 210/607 |
| 4,604,206 | 8/1986 | Sullivan | 210/603 |
| 4,620,928 | 11/1986 | Gott | 210/603 |
| 4,652,374 | 3/1987 | Cohen | 210/603 |
| 4,696,746 | 9/1987 | Ghosh et al. | 210/603 |
| 4,853,136 | 8/1989 | Roussel et al. | 210/761 |
| 4,894,162 | 1/1990 | Cournoyer | 210/603 |
| 4,915,840 | 4/1990 | Rozich | 210/605 |
| 4,966,706 | 10/1990 | Gregor | 210/609 |
| 4,983,298 | 1/1991 | Fuchs et al. | 210/613 |
| 5,057,231 | 10/1991 | Meuller et al. | 210/761 |
| 5,141,646 | 8/1992 | Rozich | 210/613 |
| 5,196,111 | 3/1993 | Nicol et al. | 210/96.1 |
| 5,200,065 | 4/1993 | Sinclair et al. | 210/104 |
| 5,204,936 | 4/1993 | Topnik | 210/614 |
| 5,217,624 | 6/1993 | Yamane et al. | 210/751 |
| 5,217,625 | 6/1993 | Khan et al. | 210/761 |
| 5,234,606 | 8/1993 | Kazama et al. | 210/761 |
| 5,234,607 | 8/1993 | Brandenburg et al. | 210/761 |

SLUDGE DIGESTION

RELATED APPLICATION

This is a continuation-in-part of U.S. application Ser. No. 08/055,159 filed on Apr. 29, 1993 entitled "Sludge Digestion", now abandoned.

BACKGROUND OF THE INVENTION

1. Field of the Invention

This invention relates to sludge treatment and, in one aspect, to treating waste activated sludge.

2. Description of Related Art

Industrial waste containing organic pollutants can be treated with pollutant-removing microorganisms which remove organic matter from liquid waste by synthesis into new protoplasm. The microorganisms use degradable organic matter for food. Oxidation of an organic substrate to carbon dioxide produces energy for the microorganism's metabolic functions.

In biological treatment of wastewater, microorganisms consume dissolved and colloidal organic matter, converting that organic matter to new microbial mass, gaseous products (e.g., carbon dioxide), and some new organic compounds. In many systems, there is a net production of microbial mass. In one form of biological treatment-activated sludge systems—the microorganisms are contained in an aqueous slurry and are kept aerobic. The excess microbial mass produced from activated sludge systems is commonly called waste activated sludge (WAS). WAS is usually very difficult to mechanically dewater and often difficult to dispose of. One problem is how to treat and dispose of excess biological solids such as waste activated sludge.

There are a variety of prior art methods for sludge treatment. Heat treatment (originally called the Porteous process) of sludges involves heating sludge to temperatures (in degrees Centigrade) above 100 degrees, generally 180–240 degrees, in a pressurized vessel for a selected time, generally 15–40 minutes, in order to improve the dewaterability of the sludge solids. Heat treatment adds no air or oxygen for oxidation. Some solids are solubilized in heat treatment. That is, hydrolysis breaks long-chain organic molecules into shorter-chain organics; contents of disrupted microbial cells are released; and the net effect is that suspended matter is converted to dissolved and colloidal matter. This produces a high-strength stream which must be returned to the biotreatment system.

A known chemolysis process is a hot acid hydrolysis process for sludge treatment. It is similar to heat treatment under acidic conditions, but temperature is reduced below usual heat treatment levels; e.g., 135 degrees Centigrade to 150 degrees Centigrade. In chemolysis, thickened sludge is acidified to a pH between 0 and 1, heated by steam injection to about 135 degrees Centigrade, and allowed to react for 2 hours in a lined pipe reactor. The stream is then neutralized with caustic, quenched with cooling water to 40 to 45 degrees Centigrade, and settled in a gravity thickener before filter pressing. Chemolysis solubilizes roughly 70–80% of the suspended solids. Oxidation is insignificant, as no oxygen or other oxidant is added. The solubilized matter, contained in the thickener supernatant and filter press filtrate, is then returned to the activated sludge system to be further converted to carbon dioxide and more microorganisms. The combination of increased conversion to carbon dioxide (in the activated sludge system) and improved dewaterability of residual solids has greatly reduced the mass of filter press sludge cake.

Wet air oxidation (WAO) is similar to heat treatment (that is, without acidification), but compressed air is injected to provide oxidation. WAO is generally performed at neutral or slightly alkaline (pH 8) conditions. Low pressure WAO is generally used to condition sludge to improve dewatering. For example, one WAO unit operated at 177 degrees Centigrade (350 Fahrenheit) and 2760 Kpa (400 psi) improved sludge solids so that a vacuum filter cake of over 40% solids was obtained without other conditioning. At those conditions, only about 5–10% of the organics (as measured by chemical oxygen demand) are removed and 17–31% of the suspended solids are solubilized. On the other hand, high-pressure WAO generally is operated at 240–300 degrees Centigrade (460–570 Fahrenheit) and 7000–14000 Kpa (1000–2000 psi) with a 40–60 minute retention. This oxidizes 60–80% of the organics and solubilizes 70–90% of the suspended solids. In addition, the greater level of oxidation provides enough energy from most sludges that operation is thermally self-sufficient, so steam is needed only for start-up. Because the level of solubilization exceeds the level of oxidation, a strong organic stream is still produced and returned to biotreatment. WAO is also used to oxidize inert or only slightly biodegradable aqueous streams prior to biological treatment.

A variation of WAO is the Barber-Colman "Wetox" process, which was intended to be operated with sulfuric acid (3 g per liter of sludge) at about 224–246 degrees Centigrade (435–475 Fahrenheit) and 4140 Kpa (600 psi). The response of different sludges can vary considerably. The addition of acid is said to improve the rate and extent of sludge oxidation and to prevent equipment scaling, which is often a major problem in WAO systems. The lower temperature and pressure, compared to high-pressure WAO, is said to reduce capital costs. Unlike most WAO systems, vapor and liquid are designed to be removed from a reactor separately to allow hot vapor to be used in a power generation scheme.

Chlorate oxidation of sludges is used in the pulp and paper industry. Conditions involve low pH (e.g. 2), higher temperature (e.g. 330–350 degrees Centigrade), and addition of chlorate and air (or oxygen). Unlike chemolysis, chlorate oxidation not only solubilizes suspended solids, but also oxidizes a large portion of the organics to carbon dioxide and other less oxidized species.

U.S. Pat. No. 3,984,311 discloses a process to reduce organic content in solution by using a oxidizing agent, such as air, in a co-catalyst system of nitrate with iodide and/or bromide ions. The conditions include relatively low pH (not more than 4, especially not more than 1) and temperature of above 100 degrees Centigrade, especially 150–300 degrees Centigrade. U.S. Pat. No. 4,212,735 discloses a similar process in which a catalyst system includes a transition metal.

There has long been a need for an effective and efficient sludge treatment process, particularly one for treating waste activated sludge and/or for pretreating aqueous streams that are difficult to biodegrade. There has long been a need for such a process which is efficiently operable at relatively lower temperatures and pressures, resulting in reduced capital costs. There has long been a need for such a process in which odor levels are significantly reduced. There has long been a need for such a process which results in reduced equipment corrosion. There has long been a need for such a process which results in an acceptably high level of solubilization of suspended solids and in high levels of oxidation.

SUMMARY OF THE PRESENT INVENTION

The present invention, in one embodiment, discloses a sludge treatment process for the acid hydrolysis and partial oxidation of liquid sludge in which waste activated sludge (WAS) is acidified (e.g. with hydrochloric acid or sulfuric acid) to a desired pH level, heated, degassed, aerated with oxygen at a desired temperature for a desired period of time, digested, and neutralized.

In one embodiment of a process according to this invention, WAS is introduced into a degassing unit in which it is acidified and heated so that carbon dioxide degasses from the material and is vented to vent treatment from the degassing unit. Preferably all or substantially all carbonates are removed from the sludge. This step inhibits foaming in downstream batch reactors and provides heat recovery. A preferable temperature range is about 60 to 120 degrees Centigrade and a preferable pH range is about 1 to 8, with about 3 to 4 most preferred. Preferably the degassing unit is run batchwise using reactor vents for direct contact heating. The degassed material is then fed to a reactor, into which steam for initial start-up and oxygen are added and the ensuing reaction results in a material whose microorganism content and whose volatile compound content is significantly reduced. After start-up, the exothermic reaction evolves heat sufficient to run the reactors. Gaseous materials evolving in the reactor may be vented to the degassing unit for heat recovery. The completed reaction mixture is then flash cooled; and either the mixture is neutralized or solids settled out from it are neutralized. "Neutralize" means to raise the pH of the reaction products to a neutral or alkaline condition by adding a base such as aqueous sodium hydroxide. In certain preferred embodiments the reaction is carried out with high thermal efficiency and no crossexchangers.

In one embodiment of a process according to this invention a batch cycle process is provided in which undigested sludge is fed alternately to different pretreating vessels for acidification, preheating, and degassing. A pretreated batch of undigested sludge is fed to a first one of a plurality of reactor vessels while another pretreatment vessel is being filled with untreated sludge. As the first batch of treated sludge is being digested in a first reactor vessel, a second batch is being pretreated in a second pretreatment vessel. Heat from the first reactor vessel may be supplied in the form of steam to either pretreatment vessel as needed. As the reaction of the first batch nears completion in the first reactor vessel, the second batch of treated sludge from the second pretreatment vessel is fed into a second reactor vessel for digestion. Pressure and heat equalization between the two reactor vessels provides energy from the first reactor vessel to drive the digestion reaction in the second reactor vessel. As digestion goes on in the second reactor vessel, the first pretreatment vessel can again be filled with untreated sludge to repeat the process. After an initial amount of start-up steam is applied to the first reactor, this batch cycle process is, preferably, auto thermal; i.e., the heat produced by the digestion reactions is used by recovering heat from vented gaseous material to heat material in the pretreatment vessels and to heat material in the reactor vessels. Oxygen is fed to the reactor vessels as needed and reaction rate is controlled by controlling the oxygen feed rate. Impeller agitators are, preferably, used in all vessels to facilitate reactions therein.

In another embodiment a semi-continuous process according to this invention is provided by employing two pretreatment vessels and one reaction vessel so that upon completing the digestion of one batch of treated sludge another batch, already pretreated, is fed into the digestion reactor.

Processes according to this invention use equipment which differs significantly from that employed in the WAO process since temperatures are generally lower, as are pressures. Lower temperatures (preferably less than or equal to 200 degrees Centigrade) allow simpler equipment and materials of construction. Reactors are charged with sludge preferably at nearly atmospheric pressure and sludge is removed at nearly atmospheric pressure. Whereas the WAO process provides a high degree of oxidation, methods according to the present invention solubilize a large fraction of solids, and oxidize a smaller fraction of the organics to avoid some of the problems of prior art processes (e.g., odor) as well as to reduce the organic load recycled back to the activated sludge system. In certain embodiments of this invention, sludge is partially acidified and warmed in the degassing step. This is important for cases in which carbon dioxide from carbonates must be released ahead of the main reactor. Warming the sludge accelerates gas release and conserves energy. Certain preferred embodiments of this invention result in a reduction of at least fifty percent of organic carbon initially present in the untreated material and a reduction of at least ninety percent of volatile suspended solids initially present in the untreated material.

Certain preferred methods according to this invention may be batch or sequencing batch operations.

The present invention, in one aspect, discloses a batch process for sludge treatment in which oxygen is sparged into the bottom of a reactor vessel to assist the initiation of the treatment reaction therein and to maintain the reaction at a desired level after initiation. In one aspect the reaction temperature is maintained, e.g. by adding oxygen, for at least thirty minutes and no more than forty-five minutes. In one aspect the level of combustibles in the reactor headspace is continuously monitored and, as needed, the pressure in the headspace is adjusted automatically (e.g. by automatically opening a vent valve interconnected with monitoring equipment) to avoid an undesirable amount of combustibles which, if instantaneously burned, would result in overpressure of the reactor.

It is, therefore, an object of at least certain preferred embodiments of the present invention to provide:

New, useful, unique, efficient, non-obvious devices and methods for sludge treatment, particularly treatment of waste activated sludge, to reduce its content of organics, volatile suspended solids, and fixed suspended solids.

Such methods which effectively operate at relatively low temperatures and pressures resulting in a concomitant savings in capital expenditure;

Such methods which result in a material with limited or no objectionable odor;

Such methods which eliminate 90% or more of volatile suspended solids in sludge;

Such methods in which foaming problems are reduced or eliminated;

Such methods in which total organic carbon is reduced by 50% or more;

Certain of such methods which do not require the use of cross exchangers, particularly elimination of a requirement for high alloy crossexchangers;

Such methods which effectively use hot vented gases and vapors (e.g. oxygen, carbon dioxide, or steam) produced in the method to reduce energy requirements;

Such methods which result in the effective removal of biological nitrogen by conversion to ammonia, providing nitrogen which is recycled or removed as desired for nutrient control;

Such methods which are autothermal, i.e., once adequately started they provide their own heat for reactions;

Such methods which may be batch methods, batch cycle (sequencing) methods, or semi-continuous methods;

Such methods which result in denatured (i.e., non-sticky) sludge flowing from a pretreatment zone which reduces downstream scaling and plugging of equipment and flow lines.

Such methods in which difficult to biodegrade compounds in aqueous streams are oxidized to readily biodegradable compounds; and Such methods which reduce the chemical oxygen demand for further treatment of the products of this process.

This invention resides not in any particular individual feature, but in combinations of them herein disclosed and claimed. There has thus been outlined, rather broadly, features of the invention in order that the detailed descriptions thereof that follow may be better understood, and in order that the present contributions to the arts may be better appreciated. There are, of course, additional features of the invention that will be described hereinafter and which may form the subject matter of the claims appended hereto. Those skilled in the art will appreciate that the conceptions upon which this disclosure is based may readily be utilized as a basis for the designing of other structures, methods and systems for carrying out the purposes of the present invention. It is important, therefore, that the claims be regarded as including any legally equivalent constructions insofar as they do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings and disclosures, other and further objects and advantages will be clear, as well as others inherent therein, from the following description of presently-preferred embodiments, given for the purpose of disclosure, when taken in conjunction with the accompanying drawings. Although these descriptions are detailed to insure adequacy and aid understanding, this is not intended to prejudice that purpose of a patent which is to claim an invention no matter how others may later disguise it by variations in form or additions of further improvements.

DESCRIPTION OF THE DRAWINGS

So that the manner in which the above-recited features, advantages and objects of the invention, as well as others which will become clear, are attained and can be understood in detail, more particular description of the invention briefly summarized above may be had by references to certain embodiments thereof which are illustrated in the appended drawings, which drawings form a part of this specification. It is to be noted, however, that the appended drawings illustrate certain preferred embodiments of the invention and are therefore not to be considered limiting of its scope, for the invention may admit to other equally effective or equivalent embodiments.

DESCRIPTION OF EMBODIMENTS PREFERRED AT THE TIME OF FILING FOR THIS PATENT

Figure 1:
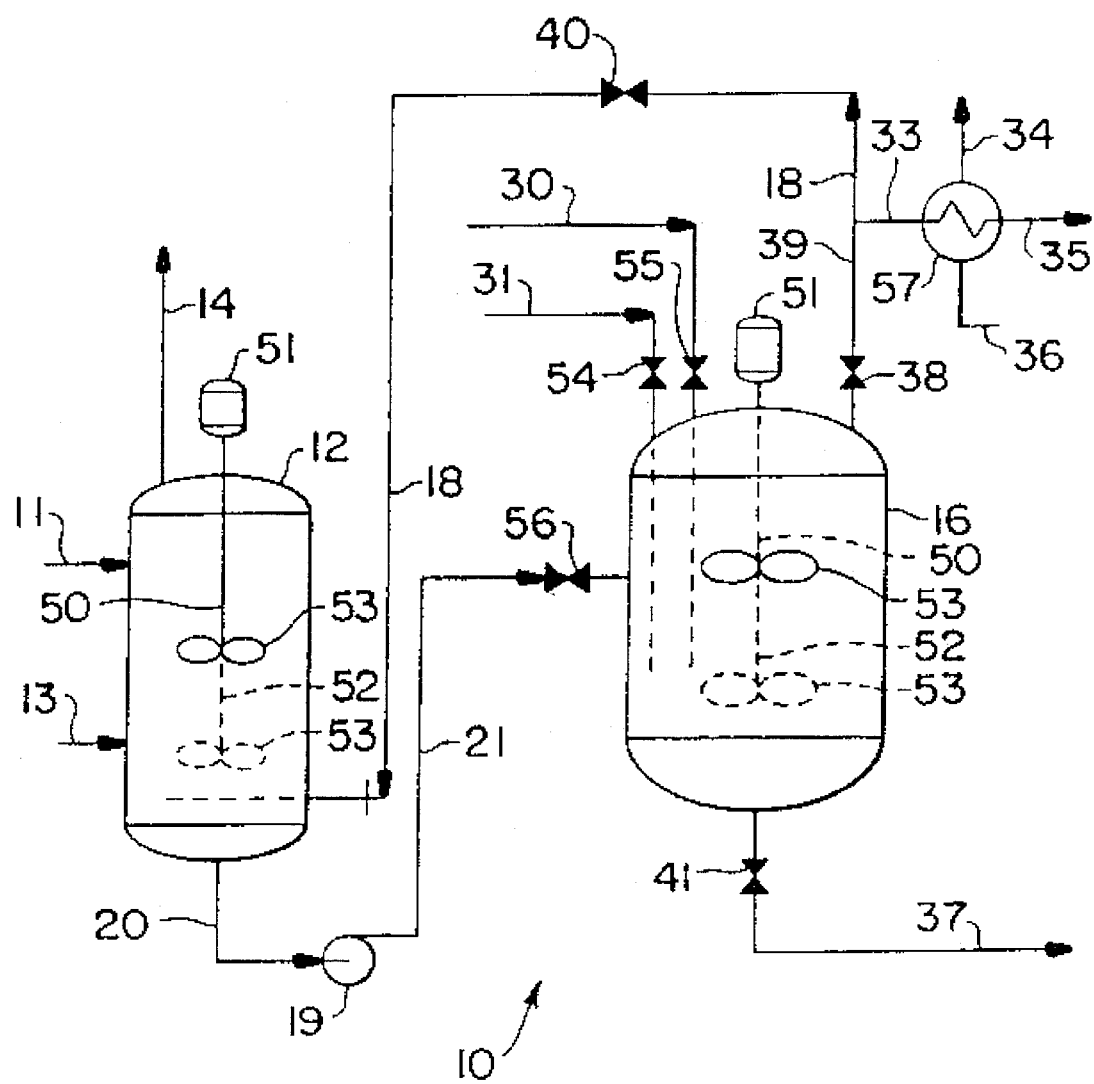
FIG. 1 is a schematic view of a batch process according to the present invention.

Referring now to FIG. 1, a process 10 according to the present invention is initiated by feeding untreated material such as waste activated sludge (WAS) via a line 11 to a degassing vessel 12. A typical feed is 70,000 gallons per day of a solution at a pH of about 7.5 which is about 5% volatile suspended solids by weight with some fixed suspended solids, (e.g. about 0.5% by weight). To accelerate the hydrolysis reaction and prevent foaming, acid is added via a line 13 to the degassing vessel 12 and material in the vessel 12 is heated as described below. Gases produced are vented via a vent line 14. Temperature in the degassing unit is elevated to between about 60 degrees Centigrade and 120 degrees Centigrade; and preferably at about 105 degrees Centigrade while pressure is maintained at atmospheric or between atmospheric and 5.0 p.s.i.g. Feed pH in the vessel 12 is adjusted to between 1 and 8 and preferably at 3. Degassed material at a pH ranging between 1 and 8 and preferably about 3 at a temperature ranging between 60 and 120 degrees Centigrade and preferably about 105 degrees Centigrade, is pumped with a pump 19 from a line 20 to a line 21 to a reactor 16. The reactor is, preferably, at or near atmospheric pressure so that the feed pump 19 is a low head pump delivering about 30 p.s.i.g. and 200 gpm.

Initially steam (pressure 475 p.s.i.g., temperature 246 degrees Centigrade) is fed into the reactor 16 via a line 30 to initiate the reaction at about 170 degrees Centigrade. Oxygen added to the reactor 16 via a line 31 produces highly biodegradable compounds such as acetates and aldehydes. Oxygen is also added to reduce the biological oxygen demand of the recycle and provide heat of oxidation to drive the reaction to between 190 degrees Centigrade to 210 degrees Centigrade, preferably 200 degrees Centigrade and pressure 300 to 400 p.s.i.g., 350 p.s.i.g. preferred. Hot gases and steam produced in the reactor 16 are vented via a vent line 18 to the degassing vessel 12, preferably providing 100% of the heat used in the vessel 12. Excess heat can be recovered from the vent for useful work or to drive a reactor via the line 33.

The product from the vessel 16 in line 37 is auto cooled by lowering the pressure by venting to a temperature between 102 and 120 degrees Centigrade, preferably 102 degrees Centigrade. Then the digested solids in the product are stripped of ammonia and recycled to the biological treatment plant. Further treatment may include gas stripping.

A valve 38 controls the flow of vented hot gasses and steam from the reactor 16 in a line 39. The vented materials may be permitted to flow to line 18 by a valve 40 or to a line 33 to a crossexchanger 57. Condensate or heat transfer fluid flows through line 36 to the crossexchanger and then via line 34 from the crossexchanger. Cooled vented gaseous material with condensate exits the crossexchanger in line 35 and is preferably fed to a vent treatment system. A valve 41 controls the flow of digested sludge product in line 37. This product is, preferably, fed to systems for ammonia stripping and solids removal. Agitators 50 with motors 51 turning shafts 52 to which are secured impellers 53 agitate the contents of the vessel 12 and of the reactor 16. A valve 54 controls flow in line 31; a valve 55 controls flow in line 30; and a valve 56 controls flow in line 21.

Figure 2:
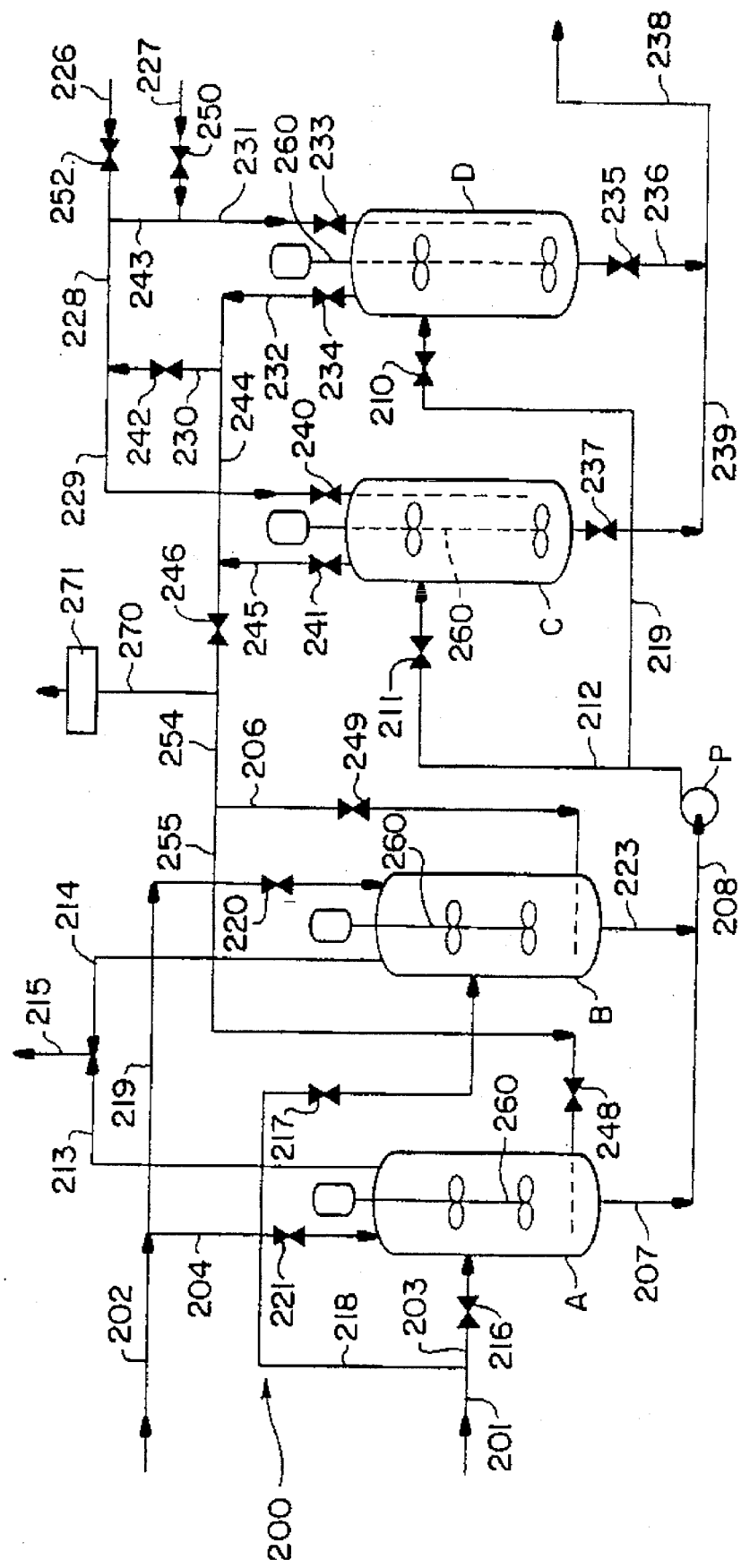
FIG. 2 is a schematic view of a sequencing batch process according to the present invention.

As shown in FIG. 2, a batch cycle process 200 according to this invention provides for the digestion of sludge solids and, in one aspect volatile suspended solids (e.g. biomass or microorganisms) from a biological wastewater treatment process which have been thickened (e.g. by centrifugation). The sludge solids are fed to either vessel A or vessel B for preparation for reaction in a reactor vessel C and a reactor vessel D. The sludge solids are fed alternately to vessels A and B and reaction is carried out alternately in vessels C and D.

In the case in which sludge solids are fed first via lines 201 and 203 while a valve 216 is open to vessel A and a valve 217 is closed to vessel B, the pH in vessel A is adjusted by introducing aqueous hydrochloric acid via lines 202 and 204 into the vessel A, most preferably achieving a pH of about 3. The vessel's contents are heated by supplying heat in the form of steam via lines 245 and 255 from the reactor vessel C (in which a reaction has recently been completed). Acidified, preheated sludge solids are pumped by a pump P in lines 207, 208 and 209 to reactor vessel D through open valve 210 (while valve 211 is closed preventing flow to reactor vessel C). Built-up pressure in the vessel A is relieved by venting gasses from the degassing sludge solids via lines 213 and 215, preferably to a vent treatment system (not shown).

While the sludge solids in vessel A are being acidified, preheated, and degassed, untreated sludge solids are fed to vessel B via lines 201 and 218 with the valve 217 open and the valve 216 closed. Upon completion of the introduction of the contents of vessel A into the reactor vessel D, the contents of vessel B are acidified, preheated, and degassed. Aqueous hydrochloric acid is fed via lines 202 and 219 to vessel B, with the valve 220 open and the valve 221 closed. Steam is fed into the vessel B via the lines 232, 244, 254 and 206. Gasses from the sludge solids are vented via the lines 214 and 215, relieving built-up pressure in the vessel B. The treated sludge solids are pumped by the pump P into the reactor vessel C via the lines 223, 208, and 212, with the valve 211 open and the valve 210 closed. After these sludge solids are reacted in the reactor vessel C, this batch cycle process is repeatable as untreated sludge solids are fed again into the vessel A.

The reactor vessels C and D are sludge solids digestion reactors in which the incoming treated sludge solids are subjected to an oxidation reaction. In the example previously discussed, with the valves 241 and 242 closed and valve 233 open, initial start-up heat in the form of steam via lines 226, 243, and 231 is applied to the treated sludge solids in the reactor vessel D and oxygen is introduced into the reactor vessel D via the lines 227 and 231. Upon completion of the reaction and after pressure reduction, with the valve 237 closed and the valve 235 open, digested sludge is removed from the reactor vessel D through the lines 236 and 238, preferably to an ammonia removal system (not shown) and/or a solids removal system (not shown).

The reaction in the reactor vessel D is exothermic. Steam with produced heat can be vented from the reactor vessel D to the reactor vessel C via lines 232, 230 and 229 with the valves 234, 240 and 242 open and the valve 246 closed. With the valves 234, 246 and 248 open and the valve 242 and 249 closed, steam is vented via lines 232, 244, 254 and 255 from the reactor vessel D to the vessel A. With the valves 242 and 248 closed, and the valves 234, 246 and 249 open, steam flows via lines 232, 244, 254, and 206 to the vessel B.

While pretreated sludge is fed to vessel C, sludge in reactor vessel D is undergoing digestion while oxygen is fed to it. When the digestion reaction in reactor vessel D is complete (as indicated by carbon dioxide generation and decreased oxygen demand as determined by analyzing gasses vented through line 232 with an analyzer 271 in a sample line 270; and analyzed gasses are, preferably, fed back to a pretreatment vessel) and the transfer of pretreated sludge from vessel B to vessel C is complete, then oxygen is shut off in the line 227 by closing a valve 250 and pressure in the reactor vessels C and D is equalized by opening the valves 234, 240 and 242. Since the reactor vessel C is at a relatively low pressure and the pressure in the reactor vessel D is at reaction pressure, opening of the valves 234, 240, and 242 will result in the transfer of pressure and heat to the vessel C to further preheat its contents. For initial start-up of the reaction in the reactor vessel C, steam is provided to the reactor vessel C via the lines 226, 228, and 229 with a valve 252 open, the valve 240 open, and the valves 242, 250 and 233 closed. Preferably, however, no start-up steam needs to be introduced to vessel C once a reaction has been completed in vessel D. When the pressure in the reactor vessels C and D has equalized, then the valves 234, 240 and 242 are closed and oxygen flow to the reactor vessel C is initiated via the lines 227, 243, 228, and 229 with the valves 233 and 242 closed and the valves 240 and 250 open. Preferably excess oxygen is continuously made available to oxidation reactor vessels in which a reaction is in progress.

The pressure in the reactor vessel D is further reduced by venting to the vessel A or B. After the pressure in the reactor vessel D is further reduced, e.g. to about 20 p.s.i.g., then the digested sludge is removed from the reactor vessel D via the line 238. When the reactor vessel D is empty, it is refilled with treated sludge solids from the vessel A and this batch cycle process is repeated.

For the process of FIG. 2 it is preferred that the contents of all vessels be agitated by plural-impeller agitators 260 to facilitate oxidation and reactions therein. It is also preferred that the pretreatment vessels be operated within these parameters: temperature in degrees Centigrade between 60 and 120; pressure between atmospheric and 5 p.s.i.g.; and pH between 1 and 8. It is also preferred that the reaction vessels be operated within these parameters: temperature in degrees Centigrade between 190 and 210; pressure between 300 and 400 p.s.i.g.; and pH between 1 and 8.

The table below presents data for various streams in certain lines in FIG. 2 for one particular embodiment: (temperature in degrees Fahrenheit; pressure in p.s.i.g.)

| Line | 201 | 202 | 254 | 215 | 208 | 227 | 238 |
|---|---|---|---|---|---|---|---|
| Temperature | 94 | 86 | 245 | 218 | 218 | 86 | 245 |
| Pressure | 5 | 5 | 15 | 5 | 10 | 350 | 20 |
| Components (in lbs.) | | | | | | | |
| Water | 19734 | 513 | 4862 | 2465 | 22644 | | 17841 |
| Ammonia | | | 58 | 26 | 32 | | 114 |
| Carbon Dioxide | | | 1034 | 993 | 41 | | 4 |
| Oxygen | | | 126 | 126 | | 884 | |
| H3PO4 | | | | | | | 73 |
| VSS | 1062 | | | | 1062 | | 106 |
| FSS | 150 | | | | 150 | | 150 |

| Line | 201 | 202 | 254 | 215 | 208 | 227 | 238 |
|---|---|---|---|---|---|---|---|
| Organics | | | 32 | 1 | 31 | | 444 |
| Hcl | | 171 | | | 171 | | 171 |
| TOTAL LBS. | 20946 | 684 | 6112 | 3611 | 24131 | 884 | 18903 |

"VSS" is volatile suspended solids (biomass); "Organics" are hydrocarbons which are products of sludge digestion such as solubilized and partially oxidized VSS, e.g. acetates and aldehydes; "FSS" is fixed suspended solids or inerts such as silicates and phosphates. In this example 90% of the VSS are reduced to organics, ammonia and phosphates ($H_3PO_4$ in the table) and 50% of the organics are oxidized to carbon dioxide and water. One digestion reaction is:

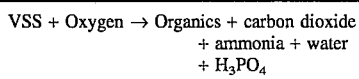

$$VSS + Oxygen \rightarrow Organics + carbon\ dioxide \\ + ammonia + water \\ + H_3PO_4$$

Figure 3:
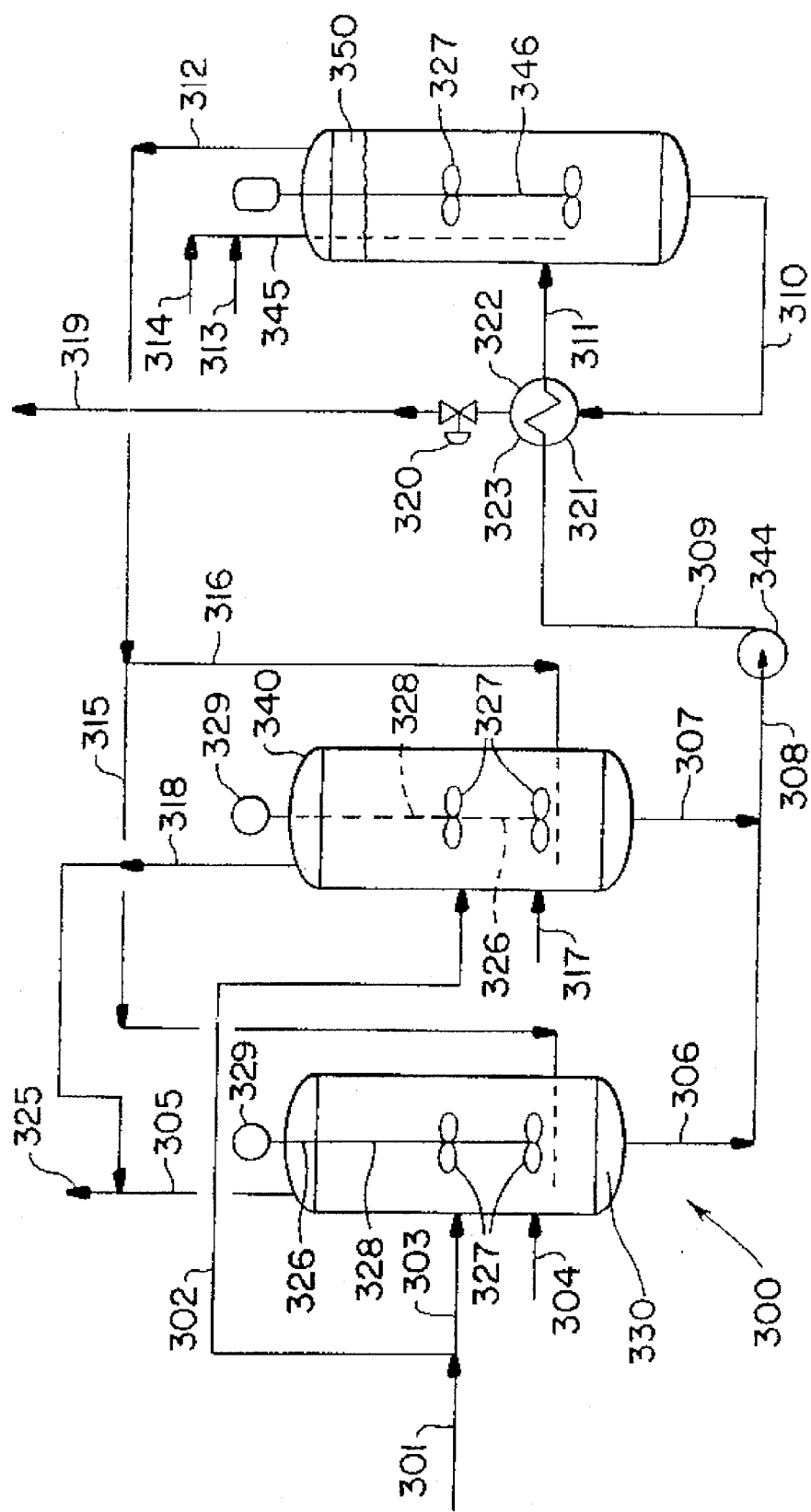
FIG. 3 is a schematic view of a semi-continuous process according to the present invention.

FIG. 3 illustrates a semi-continuous process 300 for the acid hydrolysis and partial oxidation of sludges. This embodiment treats thickened sludge batchwise to degas it with acid to a pH of between 1 and 8 and most preferably about 3, and with heat from the continuous reactor vent to a temperature of no more than 120 degrees Centigrade and most preferably approximately 102 degrees Centigrade. Although this pretreatment can be done continuously within the scope of certain embodiments of this invention, batch acidification and degassing allow more complete removal of carbonates and also render the sludge more easily pumped and less likely to plug. The sludge from the acidification, preheat, and degas steps is then pumped with a relatively high pressure pump, 344 (e.g. 350 to 500 p.s.i.g., preferably in this embodiment 400 p.s.i.g.), through a crossexchanger 321 to a continuous oxidation reactor 350. An abrasion resistant level control let down valve 320 controls the sludge flow back to the crossexchanger 321 hot fluid side 322 and via line 319 to ammonia control, if desired, and back to the cooling neutralization, solids removal and biological treatment steps as before. The crossexchanger 321 has less likelihood of plugging than with other processes due to the low levels of carbonates and the heat pretreatment of the sludge entering the cold side 323 of the crossexchanger 321. Oxygen is sparged into the continuous reactor 350 via a line 313 and a vent 312 is maintained to control temperature, oxygen concentration, and to remove carbon dioxide from the reactor vessel and other products of the partial oxidation of the sludge at relatively low temperatures, e.g. at between 180 degrees Centigrade and 210 degrees Centigrade, preferably 200 degrees Centigrade. Preferably this embodiment employs a high alloy crossexchanger 321 (e.g. titanium), a high pressure pump 344, and an erosion resistant let down valve 320.

Thickened sludge, (e.g. thickened by a conventional centrifugation thickening system and typically about 3 to 7% volatile suspended solids by weight) is fed in line 301 to either pretreatment vessel 330 via a line 303 or to a pretreatment vessel 340 via a line 302. Acid, e.g. 18% by weight aqueous hydrochloric acid, is fed into the vessels via lines 304 or 317, respectively. Heat (preferably all heat necessary) is provided to the vessels 330 and 340 from the vent line 312 from the continuous reactor 350 via lines 315 or 376, respectively. Gas is vented from the vessels 330, 340 by vent lines 305 and 318 respectively which flow into vent line 325. Vented gases may be treated to remove volatile organics or may be fed to a biological wastewater reactor. The contents of the vessels 330, 340 is agitated with an agitator 326 which includes a motor 329 which turns a shaft 328 to which are secured impellets 327 positioned in the vessel. Pretreated sludge flows via lines 306 or 307 to line 308 and is then pumped in line 309 to the crossexchanger 321 to render this process autothermal after initial start-up. Product from the reactor 350 via line 310 flows to the crossexchanger hot fluid side 322 and then out through an erosion resistant let down valve 320 and a line 319. Pretreated sludge at about 105 degrees Centigrade flows in line 309 to the crossexchanger cold fluid side 323. The pretreated sludge heated by the heat from the product then flows at 180 degrees Centigrade through line 311 to the reactor 350. Start-up steam sufficient to initiate an oxidation reaction flows via a line 314 to a line 345 and into the vessel 350, as does oxygen sufficient to maintain the reaction (and preferably an excess thereof) via a line 313. The contents of the reactor 350 are agitated with an agitator 346, like the agitators 326. The vessels 330 and 340 are used alternately so that there is a continuous flow of pretreated material to the reactor.

In conclusion, therefore, it is seen that the present invention and the embodiments disclosed herein and those covered by the appended claims are well adapted to carry out the objectives and obtain the ends set forth. Certain changes can be made in the described and in the claimed subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form its principles may be utilized.

Figure 4:
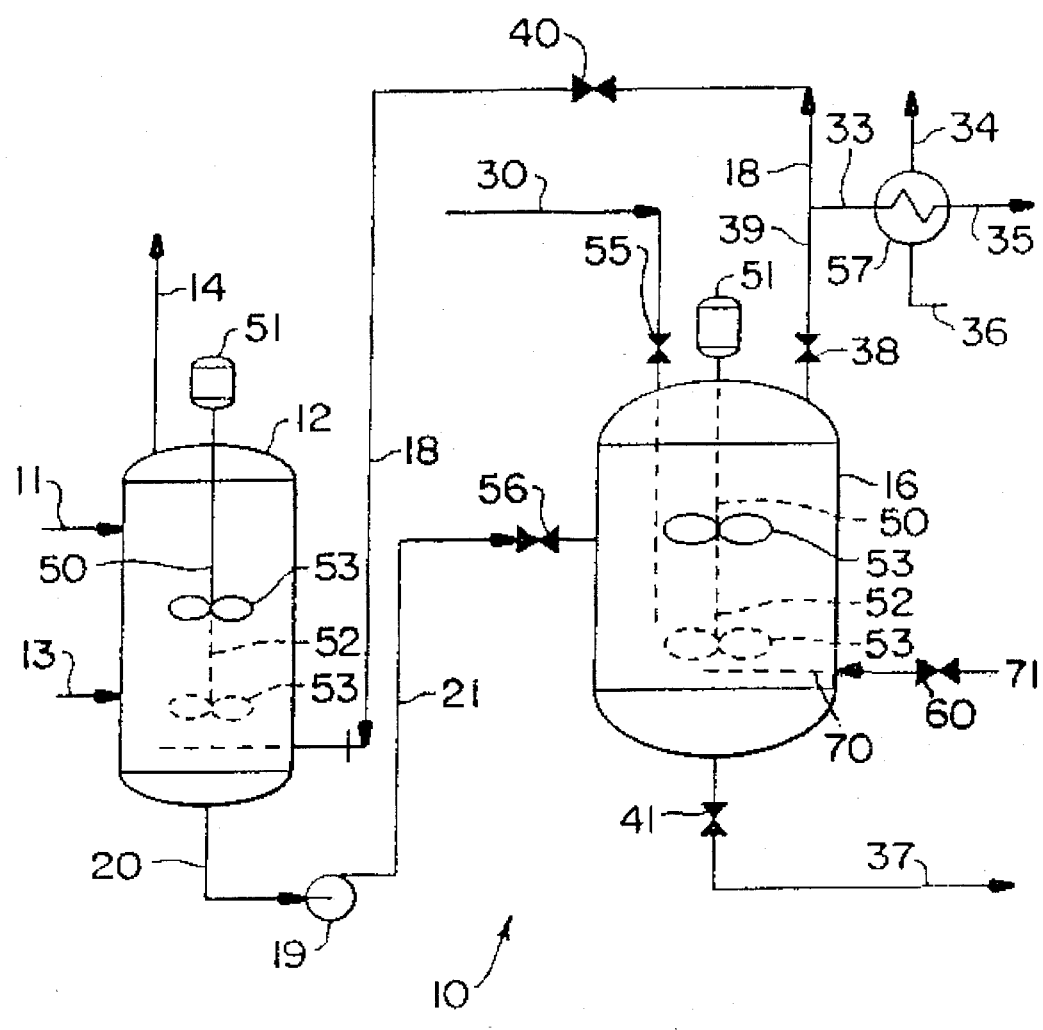
FIG. 4 is a schematic view of a batch process according to the present invention.
Figure 5:
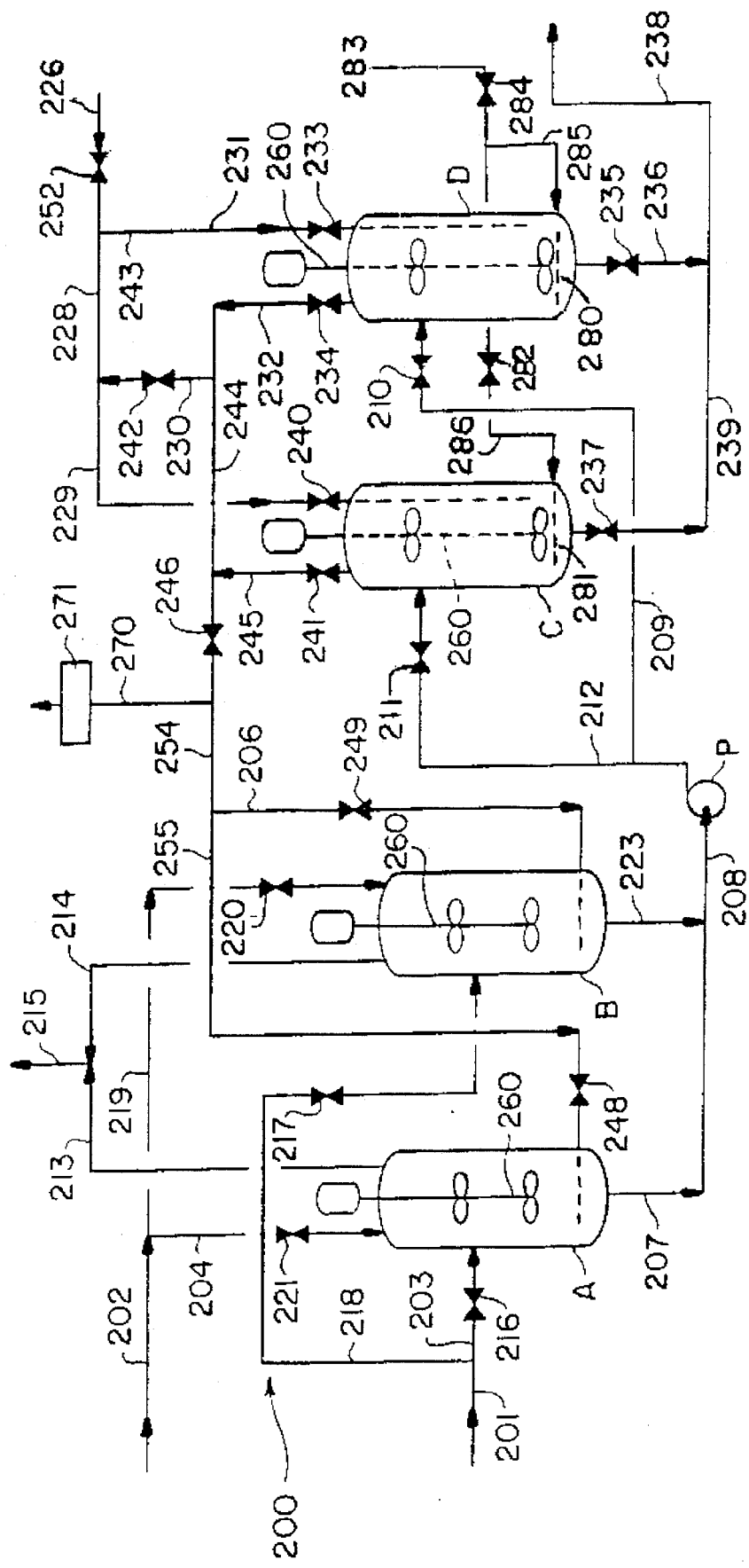
FIG. 5 is a schematic view of a sequencing batch process according to the present invention.
Figure 6:
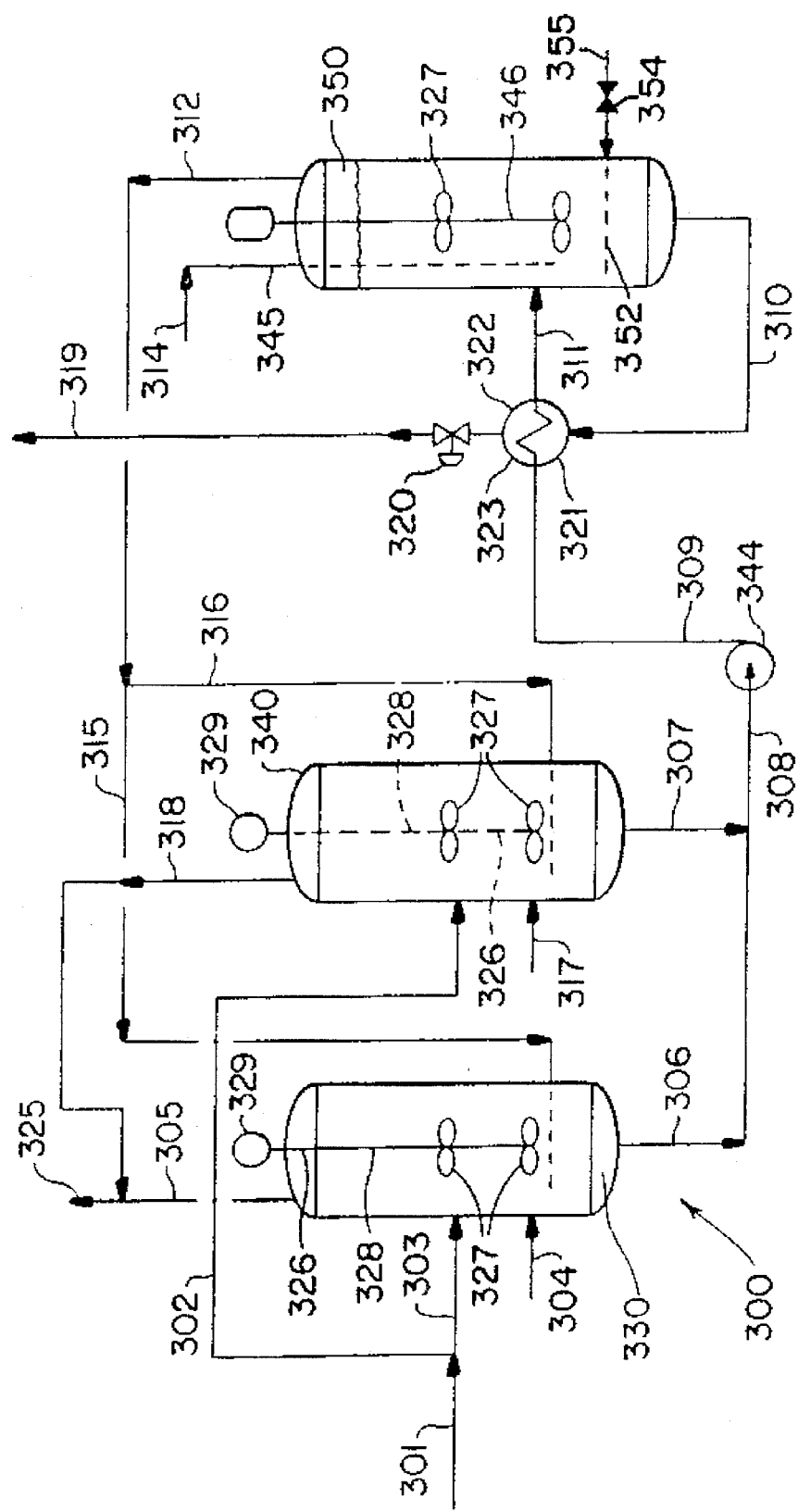
FIG. 6 is a schematic view of a semi-continuous process according to the present invention.

In FIGS. 4, 5, and 6 numerals identical to numerals in FIGS. 1, 2, and 3, respectively, represent identical items. The processes represented schematically in FIGS. 4, 5, and 6 are like the processes of FIGS. 1, 2, and 3, respectively, with similar process parameters and ranges unless stated differently below.

As shown in FIG. 4 oxygen is introduced for reasons as described above in the process of FIG. 1 (preferably to maintain at least 50 mol percent oxygen of non-condensibles in the reactor vessel headspace) through a line 71 into a sparget 70 located within and at the bottom of the reactor 16. A valve 60 controls flow in the line 71. Preferably the sparger has holes in its bottom through which oxygen is sparged into the reactor to inhibit the entry of sludge into the sparget. Preferably a low level flow of oxygen (e.g. at about 10 to about 20 pounds per hour) is always maintained through the sparget to inhibit the entry of combustible solids and/or sludge into the holes and main interior body of the sparger.

One sparget useful in this embodiment is about three and one half feet long with an outer hollow tube about one inch in diameter made from titanium. An inner tube made from monel tubing is disposed within the outer tube. Three holes about three-eighths of an inch in diameter and near the end of the tubes extend through both tubes so oxygen introduced into the monel inner tube flows out through the outer tube into the reactor. Thus the monel of the inner tube acts as a firestop and is not subjected to the corrosive effects of the sludge flowing around the outer titanium tube.

In one embodiment of a batch process according to the invention as shown schematically in FIG. 4, the reaction cycle is performed at pressures as low as about 30 p.s.i.g. over the saturation pressure of the contents of the reactor vessel.

A preferred pressure range for this reaction in the reactor (and those of FIGS. 5 and 6) is from about 130 p.s.i.g. to about 400 p.s.i.g. with the temperature preferably from about 165° to about 210° C. In one embodiment the pressure is 260 p.s.i.g. during the reaction and the temperature is about 194° C. In certain embodiments one impeller 53 is used. It is preferred that the pH of materials in the reactor range between 1 and 8. In one such embodiment, steam is initially introduced into the reactor vessel to raise the temperature therein, e.g. to about 330° F.; then oxygen is added through the sparger at about 750 to about 1000 pounds per hour to support the reaction. As the temperature rises, e.g. to about 380° F., no more steam is introduced into the reactor. In a preferred embodiment, oxygen is added until: forty-five minutes has elapsed (due to diminishing effects of treatment); or for at least thirty minutes and thereafter—up to the forty-five minute limit—as needed to maintain adequate treatment. After thirty minutes the carbon dioxide concentration above the sludge being treated in the reactor is measured (e.g. by analyzing a sample taken from the headspace or by continuously analyzing a stream taken from the headspace). A carbon dioxide level of about twenty percent or less indicates the reaction is essentially finished, an acceptable level of treatment has occurred and no further oxygen input is required. In one preferred embodiment the level of total hydrocarbons and of carbon monoxide in the headspace above the materials in the reactor is measured to avoid a high overpressure, e.g. a combustibles level greater than three percent by volume. In one aspect based on measured levels of hydrocarbons and carbon monoxide and a pressure above saturation (e.g. 50 p.s.i.), an allowable combustibles level is calculated and, if needed, some combustibles are bled off from the reactor headspace (e.g. by venting) to reduce the level thereof automatically. Certain processes of FIGS. 4, 5, and 6 are useful in methods for the acid hydrolysis and partial oxidation of waste activated liquid sludges; including, but not limited to, such sludges which contain between about 3% and about 12% by weight volatile suspended solids.

When the system of FIG. 5 is used for a batch process according to the present invention, oxygen is introduced into the reactors C and D via the spargers 281 and 280, respectively, through the appropriate flow lines 283, 285 and 286. A valve 284 controls flow through the line 283 and a valve 282 controls flow through the line 286. The reaction cycle and process and parameters, in one aspect, are as disclosed above for the process shown in FIG. 4.

When the system of FIG. 6 is used for a batch process according to the present invention, oxygen is introduced into the reactor 350 through a line 355 and a sparger 352. A valve 354 controls oxygen flow in the line 355. The reaction cycle and process and parameters, in one aspect, are as disclosed above for the process shown in FIG. 4.

The following applications were filed on even date with the parent of this application, are co-owned with this application, and their subject matter is hereby disclosed herein which may be employed with the present invention in a material treatment system (invention titles followed by applicant(s) name):

"Sludge Deodorization;" U.S. Ser. No. 08/055,157; J. Stultz, D. Bice;

"Sludge Ammonia Removal;" U.S. Ser. No. 08/055,158; J. Stultz, D. Bice;

"Tank Foundation;" U.S. Ser. No. 08/055,152 J. Stultz;

"Pipe To Concrete Transition;" U.S. Ser. No. 08/055,153; J. Stultz; now U.S. Pat. No. 5,340,164;

"Slab Joint Liquid Stop;" U.S. Ser. No. 08/055,156; J. Stultz; now U.S. Pat. No. 5,349,797;

"Sludge Clarifier Bottom;" U.S. Ser. No. 08/055,161; J. Stultz, H. Rabren;

"Sludge Clarifier Roof;" U.S. Set. No. 08/055,154; J. Stultz;

"Hopper Liner;" U.S. Ser. No. 08/055,155; J. Stultz; now U.S. Pat. No. 5,360,143;

"Waste Gas Incineration;" U.S. Ser. No. 08/055,160; J. Stultz, D. Bice

What is claimed is:

1. A method for acid hydrolysis and partial oxidation of liquid sludge, the method comprising protreating liquid sludge in at least one degassing vessel by adding acid to the liquid sludge heating the acid and liquid sludge in the degassing vessel, producing gas and treated degassed liquid sludge, venting gas from the degassing vessel, pumping the treated degassed liquid sludge to at least one oxidation reactor vessel and digesting it therein at a pressure of at least about 130 p.s.i.g. and at a reaction temperature of at least about 165° C. producing a reactor product of partially oxidized liquid sludge and hot gasses, venting hot gaseous material from the reactor vessel, recovering heat from vented hot gaseous material vented from the reactor vessel, and supplying heat recovered from the vented hot gaseous material to the degassing vessel to heat the acid and liquid sludge therein.

2. The method of claim 1 wherein the degassing vessel is maintained at a temperature no more than 120 degrees Centigrade.

3. The method of claim 1 comprising also pumping the treated degassed liquid sludge through a crossexchanger and pumping the reactor product through the crossexchanger to heat the treated degassed liquid sludge with heat from the reactor product.

4. The method of claim 1 wherein each oxidation reactor vessel has an interior headspace and the method further comprises monitoring an amount of combustibles in the headspace and reducing the amount of combustibles in the headspace when said amount exceeds a preestablished limit by introducing oxygen into the reactor vessel, the oxygen being introduced at a controlled flow rate to also facilitate and control digestion of sludge contained in the reactor vessel and facilitate production therein of biodegradable compounds.

5. The method of claim 4 wherein the oxygen is introduced into a sparger disposed at a bottom of and within the reactor vessel.

6. The method of claim 1 wherein the liquid sludge is waste activated sludge that contains about 3% to 12% by weight volatile suspended solids and at least 90% of the volatile suspended solids are removed from the liquid sludge.

7. The method of claim 1 comprising also agitating at least one of contents of the degassing vessel to facilitate pretreatment of the liquid sludge and contents of the reactor vessel to facilitate reaction therein.

8. The method of claim 1 comprising also feeding an amount of start-up steam to the reactor vessel to initialize reactive oxidation of liquid sludge therein.

9. The method of claim 1 comprising also maintaining pressure in the degassing vessel at between atmospheric and 5 p.s.i.g.

10. The method of claim 1 comprising also removing carbonates from at least one of liquid sludge in the degassing vessel and material in the reactor vessel.

11. The method of claim 1 wherein an initial amount of organic carbon in the liquid sludge is reduced by at least 50%.

12. The method of claim 1 wherein the degassing vessel is operated within these parameters:
   temperature: between 60 and 120 degrees C.
   pressure: between atmospheric and 5.0 p.s.i.g.
   pH: between 1 and 8.

13. The method of claim 12 wherein the acid is aqueous hydrochloric acid and the liquid sludge in the degassing vessel is maintained at a pH of about 3.

14. The method of claim 1 wherein the at least one degassing vessel is two pretreatment vessels and the method is semi-continuous and the method comprising also
   pretreating liquid sludge in a first pretreatment vessel wherein liquid sludge is acidified, heated, degassed and then fed as first charge to the reactor vessel, and
   pretreating liquid sludge in a second pretreatment vessel wherein liquid sludge is acidified, heated, and degassed and fed as a second charge to the reactor vessel upon completion therein of digestion of the first charge and its removal from the reactor vessel.

15. The method of claim 1 wherein the method is a batch cycling method, the at least one degassing vessel is two degassing vessels, and the at least one reactor vessel is two reactor vessels, the method comprising also
   pretreating liquid sludge in a first degassing vessel wherein liquid sludge is acidified, heated, degassed, and then fed to a first reactor vessel for digestion,
   after pretreating of liquid sludge in the first degassing vessel, pretreating liquid sludge in a second degassing vessel wherein liquid sludge is acidified, heated, and degassed and then fed to a second reactor vessel for digestion after digestion of liquid sludge in the first reactor vessel.

16. The method or claim 1 wherein digestion occurs in the oxidation reactor vessel at a pressure of less than about 400 p.s.i.g. and at a temperature of less than about 210° C.

17. The method of claim 1 wherein digestion occurs in the oxidation reactor vessel at a pressure of at least about 300 p.s.i.g. and at a temperature of at least about 170° C.

18. The method of claim 17 wherein the pressure is between 300 and 400 p.s.i.g. and the temperature is between 190° and 210° C.

19. A method for acid hydrolysis and partial oxidation of waste activated liquid sludge containing an initial amount of organic carbon and 3% to 12% by weight volatile suspended solids, the method comprising
   pretreating the liquid sludge in a degassing vessel by adding acid to the liquid sludge and heating the acid and liquid sludge in the degassing vessel, producing gas and treated degassed liquid sludge,
   adding aqueous hydrochloric acid to the liquid sludge in the degassing vessel, and
   maintaining the liquid sludge in the degassing vessel at a pH between 1 and 8, and maintaining the degassing vessel at a temperature no more than 120 degrees Centigrade,
   agitating the liquid sludge in the degassing vessel,
   venting gas from the degassing vessel,
   pumping the treated degassed liquid sludge to an oxidation reactor vessel and agitating it and digesting it therein producing a reactor product of partially oxidated liquid sludge and hot gasses,
   venting hot gasses from the reactor vessel,
   recovering heat from vented hot gasses vented from the reactor vessel,
   supplying heat recovered from the vented hot gasses to the degassing vessel to heat the acid and liquid sludge therein,
   supplying from the heat recovered from the vented hot gasses from the reactor vessel all heat necessary to pretreat the liquid sludge,
   introducing oxygen into the reactor vessel and controlling its flow therein to facilitate digestion of sludge therein and to control digestion rate,
   controlling temperature and oxygen concentration in the reactor vessel by controlling the flow of vented gasses from the reactor vessel,
   feeding an amount of start-up steam to the reactor vessel to initialize reactive oxidation of liquid sludge therein,
   removing carbonates from the liquid sludge in the degassing vessel to inhibit foaming of the liquid sludge,
   removing carbonates from material in the reactor vessel,
   operating the reactor vessel within these parameters:
      pressure: between 130 and 400 p.s.i.g.
      reaction temperature: between 165 and 210 degrees C.
      pH: between 1 and 8,
   neutralizing the reactor product, and
   the method removing at least 90% of the volatile suspended solids from the waste activated sludge and reducing the initial amount of organic carbon therein by at least 50%.

20. The method of claim 19 wherein the pressure is between 300 and 400 p.s.i.g. and the temperature is between 190° and 210° C.

21. A semi-continuous method for the acid hydrolysis and partial oxidation of liquid sludge, the method comprising
   alternately pretreating batches of liquid sludge in two pretreatment vessels, alternately producing in each pretreatment vessel an acidified, heated, degassed pretreated charge of liquid sludge,
   feeding a first pretreated charge of liquid sludge from a first pretreatment vessel to a reactor vessel for partial oxidation therein while a second charge of liquid sludge is being pretreated in a second pretreatment vessel, producing a first reactor product batch in the reactor vessel,
   upon completion of digestion of the first pretreated charge of liquid sludge in the reactor vessel and removal therefrom of the first reactor product batch, feeding a second pretreated charge of liquid sludge from the second pretreatment vessel to the reactor vessel, producing a second reactor product batch in the reactor vessel,
   removing the second reactor product batch from the reactor,
   venting gas from each pretreatment vessel as liquid sludge degasses therein,
   venting hot gaseous material from the reactor vessels and recovering heat therefrom,
   supplying heat recovered from the vented hot gaseous material to the degassing vessels, and
   the reactor vessel is operated within these parameters:
      pressure: between 130 and 400 p.s.i.g.
      reaction temperature: between 165 and 210 degrees C.
      pH: between 1 and 8.

22. The method of claim 21 wherein the pressure is between 300 and 400 p.s.i.g. and the temperature is between 190° and 210° C.

23. A batch cycle method for acid hydrolysis and partial oxidation of liquid sludge, the method comprising alternately producing batches of pretreated liquid sludge from a plurality of pretreatment vessels, the pretreatment including acidification, heating, and degassing of liquid sludge in the pretreatment vessels, feeding a first batch of pretreated liquid sludge to a first oxidation reactor vessel for digestion, the digestion producing a first reactor product batch of partially oxidated liquid sludge and first hot gaseous materials, venting the first hot gaseous materials from the first oxidation reactor vessel, recovering heat from vented first hot gaseous materials from the first oxidation reactor vessel, supplying heat recovered from the vented first hot gaseous materials to the first pretreatment vessel and then to liquid sludge in a second pretreatment vessel, feeding a second batch of pretreated liquid sludge to a second oxidation reactor vessel for digestion, the digestion producing a second reactor product batch of partially oxidated liquid sludge and second hot gaseous materials, venting the second hot gaseous materials from the second oxidation reactor vessel, recovering heat from vented second hot gaseous materials from the second oxidation reactor vessel, supplying heat recovered from the vented second hot gaseous materials to the second pretreatment vessel and then to liquid sludge in the first pretreatment vessel, and the oxidation reactor vessels are operated within these parameters:
      pressure: between 130 and 400 p.s.i.g.
      reaction temperature: between 165 and 210 degrees C.
      pH: between 1 and 8.

24. The method of claim 23 comprising also removing the first reactor product batch from the first oxidation reactor vessel and neutralizing it, and removing the second product batch from the second oxidation reactor vessel and neutralizing it.

25. The method of claim 23 wherein after the first product batch is removed from the first oxidation reactor vessel another batch of liquid sludge is fed into the first pretreatment vessel and the method is repeated.

26. The method of claim 23 wherein the pressure is between 300 and 400 p.s.i.g. and the temperature is between 190° C. and 210° C.

27. A batch cycle method for the hydrolysis and partial oxidation of liquid sludge, the method comprising alternately producing batches of pretreated liquid sludge from a plurality of pretreatment vessels, the pretreatment including acidification, heating, and degassing of liquid sludge in the pretreatment vessels, feeding a first batch of pretreated liquid sludge to a first oxidation reactor vessel for digestion, the digestion producing a first reactor product batch of partially oxidated liquid sludge and first hot gaseous materials, venting the first hot gaseous materials from the first oxidation reactor vessel, recovering heat from vented first hot gaseous materials from the first oxidation reaction vessel, supplying heat recovered from the vented first hot gaseous materials to the first pretreatment vessel and then to liquid sludge in a second pretreatment vessel, feeding a second batch of pretreated liquid sludge to a second oxidation reactor vessel for digestion, the digestion producing a second reactor product batch of partially oxidated liquid sludge and second hot gaseous materials, venting the second hot gaseous materials from the second oxidation reactor vessel, recovering heat from vented second hot gaseous materials from the second oxidation reactor vessel, supplying heat recovered from the vented second hot gaseous materials to the second pretreatment vessel and then to liquid sludge in the first pretreatment vessel, wherein after an initial amount of start-up steam is introduced into one of the oxidation reactor vessels, heat recovered from hot gaseous materials vented from the oxidation reactor vessels provides all heat necessary to pretreat liquid sludge in the pretreatment vessels, removing the first reactor product batch from the first oxidation reactor vessel and neutralizing it, and removing the second product batch from the second oxidation reactor vessel and neutralizing it, the oxidation reactor vessels operated within these parameters:
      pressure: between 130 and 400 p.s.i.g.
      reaction temperature: between 165 and 210 degrees C.
      pH: between 1 and 8, the pretreatment vessels operated within these parameters:
      temperature: between 60 and 120 degrees C.
      pressure: between atmospheric and 5.0 p.s.i.g.
      pH: between 1 and 8, supplying heat recovered from the vented first hot gaseous materials to the second oxidation reactor vessel, heat recovered from the vented first hot gaseous materials providing all heat necessary for reaction in the second oxidation reactor vessel, supplying excess oxygen continuously to oxidation reactor vessels in which reaction is in progress, and after the first reactor product batch is removed from the first oxidation reactor vessel, feeding another batch of liquid sludge into the first pretreatment vessel and repeating the method.

28. The method of claim 27 wherein the pressure is between 300 and 400 p.s.i.g. and the temperature is between 190° and 210° C.

* * * * *